(12) United States Patent
Zhou

(10) Patent No.: US 10,633,503 B2
(45) Date of Patent: Apr. 28, 2020

(54) COMPOSITION FOR PRODUCING FOAMED LAYER OF SHEET, SHEET CONTAINING THE SAME, AND PRODUCTION METHOD THEREOF

(71) Applicant: QINGDAO SANYI PLASTIC MACHINERY CO., LTD., Qingdao (CN)

(72) Inventor: Yuliang Zhou, Qingdao (CN)

(73) Assignee: QINGDAO SANYI PLASTIC MACHINERY CO., LTD., Shandong (CN)

( * ) Notice: Subject to any disclaimer, the term of this patent is extended or adjusted under 35 U.S.C. 154(b) by 0 days.

(21) Appl. No.: 15/811,628

(22) Filed: Nov. 13, 2017

(65) Prior Publication Data

US 2019/0016865 A1   Jan. 17, 2019

Related U.S. Application Data

(63) Continuation of application No. PCT/CN2017/097793, filed on Aug. 17, 2017.

(30) Foreign Application Priority Data

Jul. 17, 2017  (CN) .......................... 2017 1 0582639
Jul. 17, 2017  (CN) ..................... 2017 2 0867694 U

(51) Int. Cl.
   *C08J 9/00*     (2006.01)
   *B32B 5/18*     (2006.01)
   (Continued)

(52) U.S. Cl.
   CPC ............ *C08J 9/0061* (2013.01); *B29C 43/40* (2013.01); *B29C 43/52* (2013.01); *B32B 5/18* (2013.01);
   (Continued)

(58) Field of Classification Search
   CPC ..... C08J 9/0061; C08J 9/08; C08J 9/10; C08J 9/0023; C08J 9/0066; C08J 2323/06;
   (Continued)

(56) References Cited

U.S. PATENT DOCUMENTS

| 7,709,571 | B2 * | 5/2010 | Sim ........................ | B29C 48/94 |
| | | | | 524/491 |
| 2013/0074931 | A1 * | 3/2013 | Chen .................... | C08K 5/1515 |
| | | | | 136/259 |

(Continued)

FOREIGN PATENT DOCUMENTS

| CN | 103481517 A | 1/2014 |
| CN | 103865208 A | 6/2014 |

(Continued)

OTHER PUBLICATIONS

Machine Translation of CN 104742458 A. (Year: 2015).*

(Continued)

*Primary Examiner* — Brian Handville
(74) *Attorney, Agent, or Firm* — J.C. Patents

(57) ABSTRACT

A composition for producing a foamed layer of a sheet, comprising: a primary component and an auxiliary component; the primary component is composed of polyvinyl chloride and calcium carbonate, and the auxiliary component comprises a regulator, a stabilizer, a lubricant and a foaming agent; in parts by weight, the polyvinyl chloride is 75 parts, the calcium carbonate is 75 to 80 parts, the regulator is 6 to 8 parts, the stabilizer is 3 to 5 parts, the lubricant is 0.7 to 1.4 parts, and the foaming agent is 0.2 to 0.7 parts. The compositions for producing a foamed layer and solid layers of a sheet in the present application do not contain any glue-like component, and there is no gluing process in the production method, so it is very environmentally friendly and healthy. The foamed layer is formed by foaming polyvinyl chloride and the solid layers made of (Continued)

non-foamed polyvinyl chloride are co-extruded on two sides of the foamed layer to form a core layer of the sheet, so that the sheet produced by the compositions and the method has excellent compression resistance, warping and shrinkage performance, and is waterproof, moisture-proof and moth-proof.

14 Claims, 1 Drawing Sheet

(51) Int. Cl.
| | |
|---|---|
| B29C 43/40 | (2006.01) |
| B29C 43/52 | (2006.01) |
| C08J 9/36 | (2006.01) |
| C08L 27/06 | (2006.01) |
| C08J 9/10 | (2006.01) |
| B32B 27/18 | (2006.01) |
| B32B 37/06 | (2006.01) |
| B32B 33/00 | (2006.01) |
| B32B 27/06 | (2006.01) |
| B32B 37/10 | (2006.01) |
| B32B 27/30 | (2006.01) |
| B29C 43/02 | (2006.01) |
| B29L 7/00 | (2006.01) |
| C08J 9/08 | (2006.01) |
| B29L 31/00 | (2006.01) |

(52) U.S. Cl.
CPC .............. *B32B 27/06* (2013.01); *B32B 27/18* (2013.01); *B32B 27/30* (2013.01); *B32B 33/00* (2013.01); *B32B 37/06* (2013.01); *B32B 37/10* (2013.01); *C08J 9/103* (2013.01); *C08J 9/36* (2013.01); *C08L 27/06* (2013.01); *B29C 43/02* (2013.01); *B29L 2007/002* (2013.01); *B29L 2031/732* (2013.01); *B32B 2307/402* (2013.01); *B32B 2307/554* (2013.01); *B32B 2309/105* (2013.01); *C08J 9/0023* (2013.01); *C08J 9/0066* (2013.01); *C08J 9/08* (2013.01); *C08J 2203/02* (2013.01); *C08J 2203/04* (2013.01); *C08J 2323/06* (2013.01); *C08J 2327/06* (2013.01); *C08J 2400/30* (2013.01); *C08J 2491/06* (2013.01)

(58) Field of Classification Search
CPC ...... C08J 2327/06; B32B 27/30; B32B 33/00; B32B 37/06; B32B 37/10; B32B 27/18; B32B 27/06; B32B 5/18; B32B 2307/554; B32B 2309/105; B32B 2307/402; C08L 27/06; C08K 5/103; C08K 3/26; B29C 43/02; B29C 423/40; B29L 2007/002
See application file for complete search history.

(56) References Cited

U.S. PATENT DOCUMENTS

| | | | | |
|---|---|---|---|---|
| 2014/0141198 | A1* | 5/2014 | Teran | ................ A47G 27/0225 428/138 |
| 2015/0267025 | A1* | 9/2015 | Fang | ........................ B32B 3/26 428/318.6 |

FOREIGN PATENT DOCUMENTS

| | | |
|---|---|---|
| CN | 104175660 A | 12/2014 |
| CN | 104371218 A | 2/2015 |
| CN | 104742458 A | 7/2015 |
| CN | 105086232 A | 11/2015 |
| CN | 106280128 A | 1/2017 |
| KR | 2002-0037769 A | 5/2002 |
| KR | 2007-0080897 A | 8/2007 |

OTHER PUBLICATIONS

The Chinese International Search Report of corresponding International PCT application No. PCT/CN2017/097793, dated Apr. 18, 2018.
The Korean Examination Report of corresponding Korea, Republic of application No. 10-2017-7030359, dated Nov. 21, 2018.

* cited by examiner

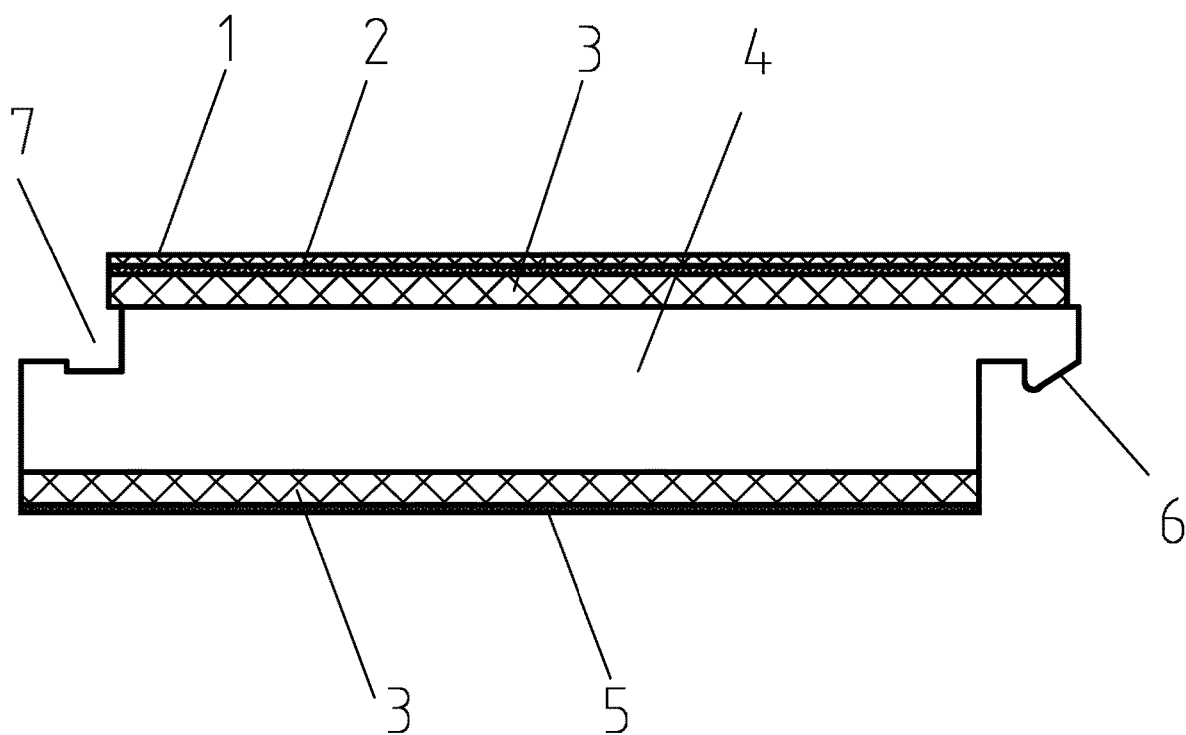

COMPOSITION FOR PRODUCING FOAMED LAYER OF SHEET, SHEET CONTAINING THE SAME, AND PRODUCTION METHOD THEREOF

CROSS-REFERENCE TO RELATED APPLICATIONS

This application is a continuation of International Application No. PCT/CN2017/097793, filed on Aug. 17, 2017, which claims priority to Chinese Patent Application No. 201710582639.9, filed on Jul. 17, 2017, and Chinese Patent Application No. 201720867694.8, filed on Jul. 17, 2017. The disclosures of the aforementioned applications are hereby incorporated by reference in their entireties.

TECHNICAL FIELD

The present application relates to a field of sheets, and in particular to a composition for producing a foamed layer of a sheet, a sheet containing the same, and a production method thereof.

BACKGROUND OF THE INVENTION

Due to advantages of compression resistance, waterproofness, moisture resistance, wear resistance, environmental friendliness and the like, PVC plastic sheets are more and more popular among consumers. However, stability and superiority of the PVC plastic sheets are inseparable from their formulations and processing technologies.

Chinese Patent Application CN103481517A, entitled "PROCESS FOR PRODUCING PVC PLASTIC FLOOR", has disclosed a PVC plastic floor which is produced by blending polyvinyl chloride (PVC) blended powder, a plasticizer, calcium carbonate, a stabilizer, paraffin, rosin and carbon powder, and then mixing, calendaring, cooling, slicing, warehousing regimen, film coating, firing, regimen, PU treatment, physical treatment, regimen at normal temperature, molding, detecting and packaging. However, this processing technology is very complicated, with high material and labor consumption which undoubtedly increases the cost of products.

SUMMARY OF THE INVENTION

In view of the above deficiencies, an object of the present application is to provide a composition for producing a foamed layer of a sheet, a sheet containing the same and a production method thereof.

For above purpose, the present application employs the following technical solutions. A composition for producing a foamed layer of a sheet, called a first composition for short, comprising: a first primary component and a first auxiliary component; the first primary component is composed of polyvinyl chloride and calcium carbonate, and the first auxiliary component comprises a first regulator, a first stabilizer, a first lubricant and a foaming agent; in parts by weight, the polyvinyl chloride is 75 parts, the calcium carbonate is 75 to 80 parts, the first regulator is 6 to 8 parts, the first stabilizer is 3 to 5 parts, the first lubricant is 0.7 to 1.4 parts, and the foaming agent is 0.2 to 0.7 parts.

Preferably, the first composition further comprises a recycled material which accounts for 5% to 25% of a total mass of the first composition.

Preferably, the first lubricant comprises a first internal lubricant and a first external lubricant.

Preferably, a mass ratio of the first internal lubricant to the first external lubricant is 2:1 to 3:1.

Preferably, the first internal lubricant is one or more of stearic acid, polyol stearic acid and oxidized polyethylene wax.

Preferably, the first external lubricant is polyethylene wax.

Preferably, the foaming agent comprises a white foaming agent and a yellow foaming agent.

Preferably, a mass ratio of the white foaming agent to the yellow foaming agent is 1:1 to 3:7.

Preferably, a mass ratio of the white foaming agent to the yellow foaming agent is 1:1 to 3:1.

Preferably, the white foaming agent is sodium hydrogen carbonate.

Preferably, the yellow foaming agent is azodicarbonamide.

The present application further provides a sheet containing the first composition described above.

Preferably, the sheet comprises the foamed layer as an intermediate layer, and solid layers on two sides of the foamed layer and integrally extruded with the foamed layer.

Preferably, an anti-slip layer is provided on a first surface of the solid layer on one side of the foamed layer.

Preferably, a color film layer is provided on a second surface of the solid layer on one side of the foamed layer.

Preferably, a wear-resistant layer is provided on a surface of the color film layer.

Preferably, the solid layers comprise an upper solid layer and a lower solid layer; the upper solid layer has a thickness of 1 mm to 1.5 mm and the lower solid layer has a thickness of 0.3 mm to 0.5 mm, respectively; the foamed layer has a thickness of 2.5 mm to 3.5 mm; the anti-slip layer has a thickness of 0.15 mm to 0.3 mm; the wear-resistant layer has a thickness of 0.15 mm to 0.5 mm; and the color film layer has a thickness of 0.07 mm to 0.08 mm.

Preferably, a composition for producing the solid layers of the sheet, called a second composition for short, comprising a second primary component and a second auxiliary component; the second primary component is composed of polyvinyl chloride and calcium carbonate, the second auxiliary component comprises a second regulator, a second stabilizer and a second lubricant; in parts by weight, the polyvinyl chloride is 50 parts, the calcium carbonate is 50 to 55 parts, the second regulator is 2 to 7 parts, the second stabilizer is 2 to 4 parts, and the second lubricant is 0.5 to 1.1 parts.

Preferably, the second composition further comprises a plasticizer which accounts for 1% to 8% of a total mass of the second composition.

Preferably, the plasticizer is dioctyl phthalate or epoxidized soybean oil.

Preferably, the plasticizer is dioctyl phthalate, epoxidized soybean oil or dioctyl terephthalate.

Preferably, in the second composition, the second lubricant comprises a second internal lubricant and a second external lubricant.

Preferably, a mass ratio of the second internal lubricant to the second external lubricant is 2:1 to 3:1.

Preferably, the second internal lubricant is one or more of stearic acid, polyol stearic acid and oxidized polyethylene wax.

Preferably, the second external lubricant is polyethylene wax.

The present application further provides a method for producing the aforementioned sheet, comprising the following steps:

(1) blending: blending the first composition and the second composition, respectively, hotly blending first, when temperatures reach 105° C. to 120° C. and then cooling and stirring;

(2) melting: when the compositions' temperatures are decreased to 30° C. to 40° C., respectively, loading each of the two blended compositions to a hopper of an extruder; the extruders are preheated to 150° C. to 180° C., and heating and extruding the two compositions to be melts, respectively;

(3) distributing and molding: in such a way of having the foamed layer as the intermediate layer and the solid layers on two sides of the foamed layer, feeding, by a distributor, the melts of the two compositions into a chamber of a mold at 160° C. to 180° C. for molding;

(4) shaping and combining: firstly, cooling and flattening the molded solid layers and the molded foamed layer together at 20° C. to 50° C., and gradually rising the temperature; secondly, placing respectively the color film layer(s) to be combined and/or the anti-slip layer to be combined on two sides of the two solid layers by a conveyor device(s), and then compressing and combining at 130° C. to 180° C.; and finally, placing the wear-resistant layer on the surface of the color film layer by a conveyor device, and then compressing and combining at 130° C. to 180° C. to form the sheet; and (5) cutting: cooling and then cutting the sheet.

Preferably, after combining the anti-slip layer and/or the color film layer(s), the surface(s) of the color film layer(s) and/or a surface of the anti-slip layer is/are embossed at 130° C. to 180° C.

The present application has following beneficial effects. The first composition and the second composition in the present application do not contain any glue-like component, and there is no gluing process in the production method, so it is very environmentally friendly and healthy. The foamed layer is formed by foaming polyvinyl chloride and the solid layers made of non-foamed polyvinyl chloride are co-extruded on two sides of the foamed layer to form a core layer of the sheet, so that the sheet produced by the compositions and the method is light in weight and also has characteristics superior to conventional sheets. That is, such a sheet has excellent compression resistance, warping and shrinkage performance, and is waterproof, moisture-proof and mothproof. Compared with conventional production technologies, the production method omits several steps, thereby reducing an equipment investment and saving power consumption and a labor cost. Moreover, since no sanding process is required in the method, there is no dust, and it is thus more environmentally friendly. And, productivity and a yield are both high.

BRIEF DESCRIPTION OF THE DRAWINGS

FIG. 1 is a schematic structural diagram of the present application, in which:

1: wear-resistant layer; 2: color film layer; 3: solid layer; 4: foamed layer; 5: anti-slip layer; 6: lock catch; and, 7: groove.

DETAILED DESCRIPTION OF THE INVENTION

The present application will be further described below by specific embodiments.

The present application relates to a composition for producing a foamed layer of a sheet, called a first composition for short, comprising: a first primary component and a first auxiliary component; the first primary component is composed of polyvinyl chloride (PVC) and calcium carbonate, and the first auxiliary component comprises a first regulator, a first stabilizer, a first lubricant and a foaming agent; in parts by weight, the polyvinyl chloride is 75 parts, the calcium carbonate is 75 to 80 parts, the regulator is 6 to 8 parts, the first stabilizer is 3 to 5 parts, the first lubricant is 0.7 to 1.4 parts, and the foaming agent is 0.2 to 0.7 parts.

The foamed layer prepared from the first composition is produced by foaming polyvinyl chloride, as a result an overall weight of the sheet is reduced. However, there will be irregular gaps in the foamed sheet, and these gaps will result in low compression resistance of the sheet. A filling of calcium carbonate in the gaps can provide a support effect. In other words, by means of a use of polyvinyl chloride accompanied by calcium carbonate, it can save an amount of polyvinyl chloride used, and also ensure sufficient compression resistance, good warping and shrinkage performance of the sheet.

The calcium carbonate in the first composition is activated light calcium carbonate. The activated light calcium carbonate is light calcium carbonate treated by an activator. A person skilled in the art can select, from a range of 75 to 80 parts, the parts of the calcium carbonate according to different requirements on the compression resistance of the sheet. For example, 76 parts, 77 parts, 78 parts, 79 parts or the like.

The first regulator in the first composition is a commercially available chemical aid mainly used for regulating a foaming effect and enhancing a plasticization effect so that the polyvinyl chloride may have a better foaming effect. Thus, the plasticization is facilitated, melt strength is increased, a mergence or fracture of foams is avoided, and a high-molecular-weight viscous melt is obtained. Moreover, sufficient foamed melts are ensured, and mobility and surface smoothness are improved. As a preferred implementation, the first regulator is an acrylate (ACR)-series impact-resistance and plasticizing aid. The ACR is an acrylate high-molecular copolymer which can greatly facilitate the plasticization and the mobility of PVC and can significantly reduce a deposition of various additives on a processed surface, so that productivity is improved. It is particularly suitable for processing hard products.

The first stabilizer in the first composition is a commercially available chemical aid, which may be a calcium-zinc stabilizer or a compound stabilizer, mainly used for inhabiting premature decomposition of the polyvinyl chloride during processing so that formulation system has sufficient stability.

As a preferred embodiment, the first composition further comprises a recycled material which accounts for 5% to 25% of a total mass of the first composition. The recycled material is a material obtained by crushing and recycling leftover materials or waste sheets generated during a production. A use of the recycled material can decrease an amount of used raw materials to a certain extent and thus reduce a cost. A person skilled in the art can select, from the above range, a proportion of the recycled material according to actual requirements. For example, the recycled material can account for 10%, 12%, 15%, 18%, 20% or the like of the total mass of the first composition.

As a preferred embodiment, the first lubricant comprises a first internal lubricant and a first external lubricant. The first external lubricant mainly functions to reduce a friction between a polymer melt and a hot metallic surface of a processing device. Since the first external lubricant has poor compatibility with the polymer melt and is likely to migrate from an inside to an outside of the polymer melt, it can form a thin lubricating layer at an interface between a plastic melt and a metal. Since the first internal lubricant has good compatibility with a polymer, it functions to decrease polymer intermolecular cohesion to reduce an internal friction heat of the plastic melt and mobility of the melt.

The first lubricant comprises a first internal lubricant and a first external lubricant, where a mass ratio of the first internal lubricant to the first external lubricant is 2:1 to 3:1.

As a preferred embodiment, the first internal lubricant is one or more of stearic acid, polyol stearic acid and oxidized polyethylene wax; and the first external lubricant is polyethylene wax.

As a preferred embodiment, the foaming agent comprises a white foaming agent and a yellow foaming agent. Both the white foaming agent and the yellow foaming agent are commercially available chemical aids, and a mass ratio of the white foaming agent to the yellow foaming agent is 1:1 to 3:7. The mass ratio of the white foaming agent to the yellow foaming agent may be a value within the above range. Specifically, the mass ratio may be determined according to a density of the foamed layer and an amount of calcium carbonate used. For example, the mass ratio may also be 4:7, 5:7, 6:7 or the like.

As a preferred embodiment, the foaming agent comprises a white foaming agent and a yellow foaming agent. Both the white foaming agent and the yellow foaming agent are commercially available chemical aids, and a mass ratio of the white foaming agent to the yellow foaming agent is 1:1 to 3:1. The mass ratio of the white foaming agent to the yellow foaming agent may be a value within the above range. Specifically, the mass ratio may be determined according to a density of the foamed layer and an amount of calcium carbonate used. For example, the mass ratio may also be 5:3, 6:3, 7:3, 8:3 or the like.

The white foaming agent mainly functions to absorb heat, and the yellow foaming agent mainly functions to release heat. In the first composition in the present application, the polyvinyl chloride can be better foamed by coordination of the white foaming agent and the yellow foaming agent. An ideal foaming effect, i.e., a weight similar to a weight of a conventional wooden floor and also ideal compression resistance, warping and shrinkage performance, cannot be achieved by a single foaming agent alone. For example, if no white foaming agent is added, heartburn will occur in a foamed layer produced. Consequently, the foamed layer will be discolored and a quality of the foamed layer is thus influenced.

As a preferred embodiment, the white foaming agent is sodium hydrogen carbonate, and the yellow foaming agent is azodicarbonamide.

The present application further provides a sheet containing the first composition described above.

The sheet of the present application comprises the foamed layer as an intermediate layer, and solid layers on two sides of the foamed layer and integrally extruded with the foamed layer, as shown in FIG. 1.

As a preferred embodiment, an anti-slip layer 5 is provided on a first surface of the solid layer 3 on one side of the foamed layer 4. When the sheet is to be mounted on a wall or on a ground, the anti-slip layer is arranged on a side of the sheet close to the wall or the ground so as to prevent a slip of the sheet.

As a preferred embodiment, a color film layer 2 is provided on a second surface of the solid layer 3 on one side of the foamed layer 4. As aesthetically required, a color film layer is provided on a side of the sheet facing a user, and pattern and color of the color film layer may be tailored according to a consumer's preference and an architectural decoration style. When both sides of the sheet need to face the user, a color film layer may be combined onto a surface of each of the two solid layers, and the color film layers may be different in pattern and color.

As a preferred embodiment, a wear-resistant layer 1 is provided on a surface of the color film layer 2. The wear-resistant layer 1 may function to protect the color film layer and the sheet itself and prevent a wear to the pattern or the color fading of the color film layer, and has waterproof, moisture-proof and mothproof effects.

As a preferred embodiment, a lock catch 6 used for connection during mounting, and a groove 7 used for accommodating the lock catch are provided on respective sides of the sheet.

The solid layers comprise an upper solid layer located on a side of the sheet coming into contact with the user and a lower solid layer located on a side of the sheet coming into contact with a sheet mounting surface, wherein the upper solid layer has a thickness of 1 mm to 1.5 mm and the lower solid layer has a thickness of 0.3 mm to 0.5 mm, respectively; the foamed layer has a thickness of 2.5 mm to 3.5 mm; the anti-slip layer has a thickness of 0.15 mm to 0.3 mm; the wear-resistant layer has a thickness of 0.15 mm to 0.5 mm; and the color film layer has a thickness of 0.07 mm to 0.08 mm.

As a preferred embodiment, a composition for producing the solid layers of the sheet, called a second composition for short, comprising a second primary component and a second auxiliary component; the second primary component is composed of polyvinyl chloride and calcium carbonate, the second auxiliary component comprises a second regulator, a second stabilizer and a second lubricant; in parts by weight, the polyvinyl chloride is 50 parts, the calcium carbonate is 50 to 55 parts, the second regulator is 2 to 7 parts, the second stabilizer is 2 to 4 parts, and the second lubricant is 0.5 to 1.1 parts. The calcium carbonate belongs to filler. An addition of the calcium carbonate may reduce a cost and improve a stability of the solid layers.

The solid layers are located on two sides of the foamed layer, and do not contain any foaming agent. That is, the solid layers will not be subjected to any foaming process. This is because the solid layers need to protect and support the foamed layer. Since a major structure of the sheet is formed by integrally extruding the foamed layer and the solid layers, the sheet has a lightweight of a conventional wooden sheet and a solidness of a conventional stone-plastic composite material.

In the second composition, there are two kinds of second regulators, i.e., a 401 regulator and a chlorinated polyethylene (CPE) regulator which are both commercially available chemical aids. The 401 regulator, as an acrylate (ACR)-series impact-resistance and plasticizing aid, facilitates an early plasticization of a material. CPE, as a toughening and impact-resistant aid, is used for increasing strength and toughness of products and improving surface hardness.

As a preferred embodiment, the second composition further comprises a plasticizer. The plasticizer is a commercially available chemical aid and accounts for 1% to 8% of a total mass of the second composition. The plasticizer can improve a plasticization effect. An amount of added plasticizer may be selected from the above range according to an expected actual plasticization effect by a person skilled in the art. For example, the plasticizer may account for 2%, 4%, 5%, 6%, 7% or the like.

As a preferred embodiment, the plasticizer is dioctyl phthalate (DOP) or epoxidized soybean oil.

As a preferred embodiment, the plasticizer is dioctyl phthalate (DOP), epoxidized soybean oil or dioctyl terephthalate (DOTP).

As a preferred embodiment, the second lubricant comprises a second internal lubricant and a second external lubricant. Functions of the second internal lubricant and the second external lubricant are same with functions of the first internal lubricant and the first external lubricant which have been described above. A mass ratio of the second internal lubricant to the second external lubricant is 2:1 to 3:1.

As a preferred embodiment, the second internal lubricant is one or more of stearic acid, polyol stearic acid and oxidized polyethylene wax; and the second external lubricant is polyethylene wax.

The present application further provides a method for producing the aforementioned sheet, comprising the following steps:

(1) blending: blending the first composition and the second composition, respectively, hotly blending first, when temperatures reach 105° C. to 120° C. and then cooling and stirring;

(2) melting: when the compositions' temperatures are decreased to 30° C. to 40° C., respectively, loading each of the two blended compositions to a hopper of an extruder; the extruders are preheated to 150° C. to 180° C., and heating and extruding the two compositions to be melts, respectively;

(3) distributing and molding: in such a way of having the foamed layer as the intermediate layer and the solid layers on two sides of the foamed layer, feeding, by a distributor, the melts of the two compositions into a chamber of a mold at 160° C. to 180° C. for molding;

(4) shaping and combining: firstly, cooling and flattening the molded solid layers and the molded foamed layer together at 20° C. to 50° C., and gradually rising the temperature; secondly, placing respectively the color film layer(s) to be combined and/or the anti-slip layer to be combined on two sides of the two solid layers by a conveyor device(s), and then compressing and combining at 130° C. to 180° C.; and finally, placing the wear-resistant layer on the surface of the color film layer by a conveyor device, and then compressing and combining at 130° C. to 180° C. to form the sheet; and (5) cutting: cooling and then cutting the sheet.

In the shaping and combining process, the molded solid layers and the molded foamed layer are to be cooled and flattened first. This is because the intermediate layer is the foamed layer, although three co-extruded layers have been formed after the solid layers and the foamed layer are co-extruded from the mold, since the intermediate layer is the foamed layer and the molded intermediate layer will be in a wavy shape, the solid layers on two sides of the foamed layer will also be in a wavy shape together with the foamed layer. Therefore, by means of instantaneously cooling and flattening the molded solid layers and the molded foamed layer by a shaping device, the co-extruded layers of the sheet may be more flat, and it is beneficial to ensure qualities of products. After cooling and flattening, the layers will be fed into a forming machine for shaping and combining simultaneously. If a temperature of the forming machine is too high in a beginning, secondary foaming will occur. Therefore, the layers will be cooled and shaped for a period of time at a lower temperature, and then combined at a higher temperature. The temperature of the forming machine becomes from low to high. That is, with a conveying of the sheet, temperatures of previous rollers are low, and temperatures of following rollers are high. Generally, the temperatures of the previous rollers are 40° C. to 80° C., and the temperatures of the following rollers are 100° C. to 160° C. When a temperature for combining is reached, other layers to be combined are conveyed to the forming machine by other conveyor devices, and then combined with the co-extruded layers.

The combining process can be adjusted according to requirements on products. It may be possible to combine the anti-slip layer first and then combine the color film layer; or combine the color film layer first and then combine the anti-slip layer; or combine the anti-slip layer and the color film layer simultaneously.

In a case where the color film layer is needed on each of two sides of the sheet, the anti-slip layer may be replaced with the color film layer.

The wear-resistant layer needs to be combined on the surface of the color film layer. That is, the wear-resistant layer is placed on the surface of the color film layer by the conveyor device, and then compressed and combined at 130° C. to 180° C. to form the sheet.

When no color film layer is needed, the color film layer may be omitted.

When no anti-slip layer is needed, the anti-slip layer may be omitted.

As a preferred embodiment, after combining the wear-resistant layer and/or the color film layer(s), the surface(s) of the color film layer(s) and/or a surface of the wear-resistant layer is/are embossed at 130° C. to 180° C. The embossing process is optional, depending upon requirements on products. When no embossing process is needed, embossing rollers may be replaced with smooth rollers.

In the method for producing the sheet of the present application, the blended compositions are molten and extruded, and then shaped and combined by a forming machine in one step. In this way, one-step forming in the production of sheets is realized.

A conventional process for producing wood-plastic composite sheets is as follows: substrate extruding-surface sanding-gluing-attaching-stacking-cold pressing-regimen-cutting-slotting-detecting and packaging-palletizing-putting in storage and packing.

A one-step processing process in the present application is as follows: one-step forming-regimen-cutting-slotting-detecting and packaging-palletizing-putting in storage and packing.

The regimen is to lay aside a formed sheet for a period of time to adapt it to humidity of surroundings. After regimen, the sheet is not likely to deform in a next procedure.

In the one-step processing process in the present application, five procedures are omitted and following investments are also saved:

1. devices for the five procedures are omitted, and space occupied by those devices is also saved;

2. since those devices are omitted, cost of those devices and electricity expenses for those devices are saved;

3. a large amount of labor consuming is saved (workers are required in all the five procedures);

4. materials are saved, for example, glue to be used before attaching; and, the ingredients in the glue are harm to good health; and 5. since no sanding process is needed, there is no dust and it is thus more environmentally friendly.

The product has the following excellent characteristics:

1. the sheet is soft and highly elastic with good elastic recovery under an impact of a heavy object, and a slip or even an injury of personnel may be greatly reduced; moreover, the sheet also has good elastic recovery for an impact damage from a heavy object and thus no damage to the sheet will be caused;

2. the sheet is environmentally friendly, poisonless and harmless, and free of radioactive contamination; and the sheet belongs to an environmentally friendly product and may be recycled;

3. the sheet has a characteristic of becoming astringent when exposed to water, and the sheet is subjected to an anti-slip treatment (i.e., the pattern of the wear-resistant layer);

4. the sheet is highly safe, insulating, flame retardant, corrosion resistant, resistant to acid and alkali, free of abnormality on the surface, and self-extinguishing when moving away from a naked flame;

5. the sheet is waterproof, moisture-proof and free of deformation when exposed to water;

6. since the sheet can absorb sound as high as 20 db, people will not be bothered by clicking noise from high-heeled shoes when such sheets of the present application are used in quiet environments such as hospital wards, libraries and conference halls;

7. the sheet may be processed in various colors and patterns, and a wider range of patterns may be provided for users' choices so that personalized customization may be realized;

8. construction and mounting are simple;

9. the sheet has a ultrahigh cost performance: it is more excellent in performance while much less expensive than special wooden floor;

10. a density of a finished sheet may be arbitrarily controlled within 0.9 $T/m^3$ to 1.2 $T/m^3$;

11. a shrinkage ratio of the sheet is ½ to ¼ of that of the conventional wood-plastic composite sheets;

12. substrate may be realized by in-mold multi-layer combining, and then, like the SPC (stone-plastic composite) floor, the color film layer and the wear-resistant layer are combined and molded synchronously, and the products may be directly UV slotted after the products taking down from a production line and then sold as finished products;

13. cost of devices, materials, labor and the multi-step method is reduced greatly, and a degree of automation is high; and 14. the sheet is high in yield, light in weight, low in expansion and shrinkage, and free of crack, deformation and pollution.

Embodiment 1

Raw materials were prepared according to Table 1. Table 1 shows the amount of the materials used in one batch.

TABLE 1

Formulation ingredients in Embodiment 1
Formulation in Embodiment 1

| Formulation for a first composition | | | Formulation for the a second composition | | |
|---|---|---|---|---|---|
| Product name | Amount (kg) | Manufacturer | Product name | Amount (kg) | Manufacturer |
| Polyvinyl chloride resin | 75 | Dezhou Shihua Chemical Co., Ltd. | Polyvinyl chloride resin | 50 | Dezhou Shihua Chemical Co., Ltd. |
| Calcium carbonate | 75 | Jiangxi Guanfeng New Material Co., Ltd. | Calcium carbonate | 50 | Jiangxi Guanfeng New Material Co., Ltd. |
| Recycled material | 40 | Leftover materials of products of our factory | Second regulator 401 | 4 | Zibo HuaXing Additives Co., Ltd. |
| First regulator | 7 | Zibo HuaXing Additives Co., Ltd. | Second stabilizer | 2.7 | Nanjing Jinling Chemical Co., Ltd. |
| First stabilizer | 4 | Nanjing Jinling Chemical Co., Ltd. | PE wax (polyethylene wax) | 0.4 | BASF |
| PE wax (polyethylene wax) | 0.4 | BASF | Second internal lubricant 60 (polyol stearic acid) | 0.6 | Zibo HuaXing Additives Co., Ltd. |
| First internal lubricant 60 (polyol stearic acid) | 0.7 | Zibo HuaXing Additives Co., Ltd. | Second regulator CPE | 3 | |
| OA6 (oxidized polyethylene wax) | 0.4 | BASF | DOP (dioctyl phthalate) | 7 | Puyang Chengyi Plasticizer Co., Ltd. |
| Yellow foaming agent | 0.1 | Shanghai Jieshangjie Chemical Co., Ltd. | — | — | — |
| White foaming agent | 0.3 | | — | — | — |

Qingdao Makebest Trading Co., Ltd. is the unique general agency of the BASF in China.

OA6 (oxidized polyethylene wax) is high-density oxidized polyethylene wax, and functions to facilitate plasticization and increase current in an earlier stage and plays a lubricating role in a later stage. Its internal lubrication effect is better than external lubrication effect.

The PE wax is an external lubricant for PVC processing to adjust plasticization time and increase surface smoothness of a product. A too small amount of PE wax will result in short plasticization time, serious adhesion and poor heat stability while a too large amount of PE wax will result in precipitation and in-mold scaling.

The 60 is an internal lubricant for adjusting an internal sliding property of PVC material, reducing an internal friction of a melt, decreasing current and facilitating a uniform plasticization of the material. An overuse of the 60 will damage a viscosity of the melt.

After the materials were prepared according to Table 1, a production of a floor started, specifically comprising the following steps:

(1) blending: blending the first composition and the second composition, respectively, hotly blending first, when temperatures reach 105° C. to 110° C. and then cooling and stirring;

wherein the DOP (which is liquid) was slowly poured into a rotating agitator when the second composition was stirred, so that stirring was more uniform;

(2) melting: when the compositions' temperatures were decreased to 30° C. to 35° C., respectively, loading each of the two blended compositions to a hopper of an extruder; the extruders are preheated to 150° C. to 160° C., and heating and extruding the two compositions to be melts, respectively;

(3) distributing and molding: in such a way of having the foamed layer as an intermediate layer and the solid layers on two sides of the foamed layer, feeding, by a distributor, the melts of the two compositions into a chamber of a mold at 160° C. to 180° C. for molding;

(4) shaping and combining: firstly, cooling and flattening the molded solid layers and the molded foamed layer together at 20° C. to 25° C., and gradually rising the temperature; secondly, placing respectively a color film layer to be combined and an anti-slip layer to be combined on two sides of the two solid layers by conveyor devices, and then compressing and combining at 130° C. to 150° C.; and finally, placing a wear-resistant layer on a surface of the color film layer by a conveyor device, and then compressing and combining at 130° C. to 150° C. to form the sheet; and, after combining the anti-slip layer and the color film layer, embossing the surface of the color film layer and/or a surface of the anti-slip layer at 130° C. to 150° C., and (5) cutting: cooling and then cutting the sheet.

Embodiment 2

Raw materials were prepared according to Table 2. Table 2 shows amount of the materials used in one batch.

TABLE 2

Formulation ingredients in Embodiment 2
Formulation in Embodiment 2

| Formulation for a first composition | | | Formulation for a second composition | | |
|---|---|---|---|---|---|
| Product name | Amount (kg) | Manufacturer | Product name | Amount (kg) | Manufacturer |
| Polyvinyl chloride resin | 75 | Qilu Branch of China Petroleum & Chemical Corporation | Polyvinyl chloride resin | 50 | Qilu Branch of China Petroleum & Chemical Corporation |
| Calcium carbonate | 75 | Jiangxi Guanfeng New Material Co., Ltd. | Calcium carbonate | 50 | Jiangxi Guanfeng New Material Co., Ltd. |
| Recycled material | 40 | Leftover materials of products of our factory | Second regulator 401 | 2 | Zibo HuaXing Additives Co., Ltd. |
| First regulator | 7 | Zibo HuaXing Additives Co., Ltd. | Second stabilizer | 2.7 | Nanjing Jinling Chemical Co., Ltd. |
| First stabilizer | 3.8 | Nanjing Jinling Chemical Co., Ltd. | PE wax (polyethylene wax) | 0.3 | BASF |
| PE wax (polyethylene wax) | 0.4 | BASF | Second internal lubricant 60 (polyol stearic acid) | 0.6 | Zibo HuaXing Additives Co., Ltd. |
| First internal lubricant 60 (polyol stearic acid) | 0.75 | Zibo HuaXing Additives Co., Ltd. | Second regulator CPE | 4 | |
| OA6 (oxidized polyethylene wax) | 0.45 | BASF | Epoxidized soybean oil | 5 | Puyang Chengyi Plasticizer Co., Ltd. |

TABLE 2-continued

Formulation ingredients in Embodiment 2
Formulation in Embodiment 2

| Formulation for a first composition | | | Formulation for a second composition | | |
|---|---|---|---|---|---|
| Product name | Amount (kg) | Manufacturer | Product name | Amount (kg) | Manufacturer |
| Yellow foaming agent | 0.2 | Shanghai Jieshangjie Chemical Co., Ltd. | — | — | — |
| White foaming agent | 0.5 | | — | — | — |

After the materials were prepared according to Table 2, a production of a floor started, specifically comprising the following steps:

(1) blending: blending the first composition and the second composition, respectively, hotly blending first, when temperatures reach 110° C. to 115° C. and then cooling and stirring;

(2) melting: when the compositions' temperatures were decreased to 30° C. to 40° C., respectively, loading each of the two blended compositions to a hopper of an extruder; the extruders are preheated to 160° C. to 170° C., and heating and extruding the two compositions to be melts, respectively;

(3) distributing and molding: in such a way of having the foamed layer as an intermediate layer and the solid layers on two sides of the foamed layer, feeding, by a distributor, the melts of the two compositions into a chamber of a mold at 165° C. to 170° C. for molding;

(4) shaping and combining: firstly, cooling and flattening the molded solid layers and the molded foamed layer together at 35° C. to 40° C., and gradually rising the temperature; secondly, placing respectively a color film layer(s) to be combined and/or an anti-slip layer to be combined on two sides of the two solid layers by a conveyor device(s), and then compressing and combining at 150° C. to 160° C.; and finally, placing a wear-resistant layer on a surface of the color film layer by a conveyor device, and then compressing and combining at 150° C. to 160° C. to form the sheet; and, after combining the anti-slip layer and the color film layer(s), embossing the surface(s) of the color film layer(s) and/or a surface of the anti-slip layer at 150° C. to 160° C., and (5) cutting: cooling and then cutting the sheet.

Embodiment 3

Raw materials were prepared according to Table 3. Table 3 shows amount of the materials used in one batch.

TABLE 3

Formulation ingredients in Embodiment 3
Formulation in Embodiment 3

| Formulation for a first composition | | | Formulation for a second composition | | |
|---|---|---|---|---|---|
| Product name | Amount (kg) | Manufacturer | Product name | Amount (kg) | Manufacturer |
| Polyvinyl chloride resin | 75 | Dezhou Shihua Chemical Co., Ltd. | Polyvinyl chloride resin | 75 | Dezhou Shihua Chemical Co., Ltd. |
| Calcium carbonate | 75 | Jiangxi Guanfeng New Material Co., Ltd. | Calcium carbonate | 50 | Jiangxi Guanfeng New Material Co., Ltd. |
| Recycled material | 40 | Leftover materials of products of our factory | Second regulator 401 | 2 | Zibo HuaXing Additives Co., Ltd. |
| First regulator | 6.5 | Zibo HuaXing Additives Co., Ltd. | Second stabilizer | 3 | Nanjing Jinling Chemical Co., Ltd. |
| First stabilizer | 3.8 | Nanjing Jinling Chemical Co., Ltd. | PE wax (polyethylene wax) | 0.35 | BASF |
| PE wax (polyethylene wax) | 0.5 | BASF | Second internal lubricant 60 (polyol stearic acid) | 0.6 | Zibo HuaXing Additives Co., Ltd. |
| First internal lubricant 60 (polyol stearic acid) | 0.75 | Zibo HuaXing Additives Co., Ltd. | Second regulator CPE | 3 | |
| OA6 (oxidized polyethylene wax) | 0.4 | BASF | DOTP (dioctyl terephthalate) | 5 | PuyangChengyi Plasticizer Co., Ltd. |

TABLE 3-continued

Formulation ingredients in Embodiment 3
Formulation in Embodiment 3

| Formulation for a first composition | | | Formulation for a second composition | | |
|---|---|---|---|---|---|
| Product name | Amount (kg) | Manufacturer | Product name | Amount (kg) | Manufacturer |
| Yellow foaming agent | 0.2 | Shanghai Jieshangjie Chemical Co., Ltd. | — | — | — |
| White foaming agent | 0.2 | | — | — | — |

After the materials were prepared according to Table 3, a production of a floor started, specifically comprising the following steps:

(1) blending: blending the first composition and the second composition, respectively, hotly blending first, when temperatures reach 115° C. to 120° C. and then cooling and stirring;

(2) melting: when the compositions' temperatures were decreased to 35° C. to 40° C., respectively, loading each of the two blended compositions to a hopper of an extruder; the extruders are preheated to 170° C. to 180° C., and heating and extruding the two compositions to be melts, respectively;

(3) distributing and molding: in such a way of having the foamed layer as an intermediate layer and the solid layers on two sides of the foamed layer, feeding, by a distributor, the melts of the two compositions into a chamber of a mold at 170° C. to 180° C. for molding;

(4) shaping and combining: firstly, cooling and flattening the molded solid layers and the molded foamed layer together at 40° C. to 50° C., and gradually rising the temperature; secondly, placing respectively a color film layer(s) to be combined and/or an anti-slip layer to be combined on two sides of the two solid layers by a conveyor device(s), and then compressing and combining at 170° C. to 180° C.; and finally, placing a wear-resistant layer on a surface of the color film layer by a conveyor device, and then compressing and combining at 170° C. to 180° C. to form the sheet; and, after combining the anti-slip layer and the color film layer(s), embossing the surface(s) of the color film layer(s) and/or a surface of the anti-slip layer at 170° C. to 180° C., and (5) cutting: cooling and then cutting the sheet.

Embodiment 4

Raw materials were prepared according to Table 4. Table 4 shows amount of the materials used in one batch.

TABLE 4

Formulation ingredients in Embodiment 4
Formulation in Embodiment 4

| Formulation for a first composition | | | Formulation for a second composition | | |
|---|---|---|---|---|---|
| Product name | Amount (kg) | Manufacturer | Product name | Amount (kg) | Manufacturer |
| Polyvinyl chloride resin | 75 | Dezhou Shihua Chemical Co., Ltd. | Polyvinyl chloride resin | 75 | Dezhou Shihua Chemical Co., Ltd. |
| Calcium carbonate | 75 | Jiangxi Guanfeng New Material Co., Ltd. | Calcium carbonate | 50 | Jiangxi Guanfeng New Material Co., Ltd. |
| Recycled material | 40 | Leftover materials of products of our factory | Second regulator 401 | 2.7 | Zibo HuaXing Additives Co., Ltd. |
| First regulator | 7 | Zibo HuaXing Additives Co., Ltd. | Second stabilizer | 3 | Nanjing Jinling Chemical Co., Ltd. |
| First stabilizer | 4 | Nanjing Jinling Chemical Co., Ltd. | PE wax (polyethylene wax) | 0.3 | BASF |
| PE wax (polyethylene wax) | 0.45 | BASF | Second internal lubricant 60 (polyol stearic acid) | 0.8 | Zibo HuaXing Additives Co., Ltd. |
| First internal lubricant 60 (polyol stearic acid) | 0.8 | Zibo HuaXing Additives Co., Ltd. | Second regulator CPE | 3 | |

TABLE 4-continued

Formulation ingredients in Embodiment 4
Formulation in Embodiment 4

| Formulation for a first composition | | | Formulation for a second composition | | |
|---|---|---|---|---|---|
| Product name | Amount (kg) | Manufacturer | Product name | Amount (kg) | Manufacturer |
| OA6 (oxidized polyethylene wax) | 0.45 | BASF | DOTP (dioctylterephthalate) | 5 | Puyang Chengyi Plasticizer Co., Ltd. |
| Yellow foaming agent | 0.2 | Shanghai Jieshangjie Chemical Co., Ltd. | — | — | — |
| White foaming agent | 0.6 | — | — | — | — |

After the materials were prepared according to Table 4, a production of a floor started, specifically comprising the following steps:

(1) blending: blending the first composition and the second composition, respectively, hotly blending first, when temperatures reach 105° C. to 120° C. and then cooling and stirring;

(2) melting: when the compositions' temperatures were decreased to 30° C. to 40° C., respectively, loading each of the two blended compositions to a hopper of an extruder; the extruders are preheated to 150° C. to 180° C., and heating and extruding the two compositions to be melts, respectively;

(3) distributing and molding: in such a way of having the foamed layer as an intermediate layer and the solid layers on two sides of the foamed layer, feeding, by a distributor, the melts of the two compositions into a chamber of a mold at 160° C. to 180° C. for molding;

(4) shaping and combining: firstly, cooling and flattening the molded solid layers and the molded foamed layer together at 20° C. to 50° C., and gradually rising the temperature; secondly, placing respectively a color film layer to be combined and an anti-slip layer to be combined on two sides of the two solid layers by conveyor devices, and then compressing and combining at 130° C. to 180° C.; and finally, placing a wear-resistant layer on a surface of the color film layer by a conveyor device, and then compressing and combining at 130° C. to 180° C. to form the sheet; and, after combining the anti-slip layer and the color film layer, embossing the surface of the color film layer and/or a surface of the anti-slip layer at 130° C. to 180° C., and (5) cutting: cooling and then cutting the sheet.

Embodiment 5

Raw materials were prepared according to Table 5.

TABLE 5

Formulation ingredients in Embodiment 5
Formulation in Embodiment 3

| Formulation for a first composition | | | Formulation for a second composition | | |
|---|---|---|---|---|---|
| Product name | Amount (kg) | Manufacturer | Product name | Amount (kg) | Manufacturer |
| Polyvinyl chloride resin | 75 | Dezhou Shihua Chemical Co., Ltd. | Polyvinyl chloride resin | 50 | Dezhou Shihua Chemical Co., Ltd. |
| Calcium carbonate | 75 | Jiangxi Guanfeng New Material Co., Ltd. | Calcium carbonate | 50 | Jiangxi Guanfeng New Material Co., Ltd. |
| First regulator | 7 | Zibo HuaXing Additives Co., Ltd. | Second regulator 401 | 5 | Zibo HuaXing Additives Co., Ltd. |
| First stabilizer | 4 | Nanjing Jinling Chemical Co., Ltd. | Second stabilizer | 2.7 | Nanjing Jinling Chemical Co., Ltd. |
| PE wax (polyethylene wax) | 0.6 | BASF | PE wax (polyethylene wax) | 0.3 | BASF |
| First internal lubricant 60 (polyol stearic acid) | 0.7 | Zibo HuaXing Additives Co., Ltd. | Second internal lubricant 60 (polyol stearic acid) | 0.6 | Zibo HuaXing Additives Co., Ltd. |
| OA6 (oxidized polyethylene wax) | 0.4 | BASF | Second regulator CPE | 2 | |

TABLE 5-continued

Formulation ingredients in Embodiment 5
Formulation in Embodiment 3

| Formulation for a first composition | | | Formulation for a second composition | | |
|---|---|---|---|---|---|
| Product name | Amount (kg) | Manufacturer | Product name | Amount (kg) | Manufacturer |
| Yellow foaming agent | 0.35 | Shanghai Jieshangjie Chemical Co., Ltd | OA6 (oxidized polyethylene wax) | 0.2 | BASF |
| White foaming agent | 0.9 | — | — | — | — |

After the materials were prepared according to Table 5, a production of a non-floor sheet started, specifically comprising the following steps:

(1) blending: blending the first composition and the second composition, respectively, hotly blending first, when temperatures reach 105° C. to 120° C. and then cooling and stirring;

(2) melting: when the compositions' temperatures were decreased to 30° C. to 40° C., respectively, loading each of the two blended compositions to a hopper of an extruder; the extruders are preheated to 150° C. to 180° C., and heating and extruding the two compositions to be melts, respectively;

(3) distributing and molding: in such a way of having the foamed layer as an intermediate layer and the solid layers on two sides of the foamed layer, feeding, by a distributor, the melts of the two compositions into a chamber of a mold at 160° C. to 180° C. for molding;

(4) shaping and combining: firstly, cooling and flattening the molded solid layers and the molded foamed layer together at 20° C. to 50° C., and gradually rising the temperature; secondly, placing color film layers to be combined on two sides of the two solid layers by conveyor devices, respectively, and then compressing and combining at 130° C. to 180° C.; and finally, placing a wear-resistant layer on a surface of the color film layer by a conveyor device, respectively, and then compressing and combining at 130° C. to 180° C. to form the sheet; and, after the color film layers were combined, embossing the surfaces of the color film layers at 130° C. to 180° C.; and (5) cutting: cooling and then cutting the sheet.

Performance tests were performed on the sheets produced in Embodiments 1 to 5 and a conventional sheet, and test results are as shown in Table 6.

TABLE 6

Comparison between the sheets produced in the present application and the conventional sheet in terms of various performance indexes

| Performance index | Embodiment 1 | Embodiment 2 | Embodiment 3 | Embodiment 4 | Embodiment 5 | Conventional sheet |
|---|---|---|---|---|---|---|
| Dimensional stability at 80° C., shrinkage | ≤0.2% | ≤0.2% | ≤0.3% | ≤0.5% | ≤0.3% | ≤1.2% |
| Warping performance after heating for 6 hours at 80° C. | ≤0.20 mm | ≤0.25 mm | ≤0.33 mm | ≤0.35 mm | ≤0.34 mm | ≤2 mm |
| Strength of lock catch | ≥20 kgf/50 mm | ≥20 kgf/50 mm | ≥18 kgf/50 mm | ≥21 kgf/50 mm | ≥22 kgf/50 mm | ≥17 kgf/50 mm |
| Bonding strength | ≥25 kgf/50 mm | ≥25 kgf/50 mm | ≥25 kgf/50 mm | ≥25 kgf/50 mm | ≥25 kgf/50 mm | ≥17 kgf/50 mm |
| Peeling strength | ≥10 kgf/50 mm | ≥10 kgf/50 mm | ≥10 kgf/50 mm | ≥10 kgf/50 mm | ≥10 kgf/50 mm | ≥8 kgf/50 mm |
| Residual depression | ≤0.20 mm | ≤0.20 mm | ≤0.20 mm | ≤0.20 mm | ≤0.20 mm | ≤0.50 mm |

It can be seen from Table 6 that various performance indexes of the sheets produced in the present application are superior to those of the conventional sheet.

What is claimed is:

1. A sheet, comprising: a foamed layer, a first solid layer and a second solid layer, the first solid layer and the second solid layer being directly formed on two sides of the foamed layer via co-extruding with the foamed layer; wherein, the foamed layer is prepared from a first composition, and the first composition consists of polyvinyl chloride, calcium carbonate, a first regulator, a first stabilizer, a first lubricant and a foaming agent; in parts by weight,
the polyvinyl chloride 75 parts;
the calcium carbonate 75-80 parts;
the first regulator 6-8 parts;
the first stabilizer 3-5 parts;
the first lubricant 0.7-1.4 parts; and
the foaming agent 0.2-0.7 parts;
each of the first and second solid layers is prepared from a second composition, and the second composition comprises a second primary component and a second auxiliary component; the second primary component is composed of polyvinyl chloride and calcium carbonate, and the second auxiliary component comprises a second regulator, a second stabilizer and a second lubricant; in parts by weight, the polyvinyl chloride 50 parts;
the calcium carbonate 50-55 parts;
the second regulator 2-7 parts;
the second stabilizer 2-4 parts; and
the second lubricant 0.5-1.1 parts; and
the sheet does not contain glue-like component.

2. The sheet according to claim 1, wherein the first lubricant comprises a first internal lubricant and a first external lubricant, and a mass ratio of the first internal lubricant to the first external lubricant is 2:1 to 3:1; the second lubricant comprises a second internal lubricant and a second external lubricant; and a mass ratio of the second internal lubricant to the second external lubricant is 2:1 to 3:1.

3. The sheet according to claim 2, wherein the first internal lubricant and the second internal lubricant are one or more of stearic acid, polyol stearic acid and oxidized polyethylene wax; and the first external lubricant and the second external lubricant are polyethylene wax.

4. The sheet according to claim 2, wherein the foaming agent comprises a white foaming agent and a yellow foaming agent, and a mass ratio of the white foaming agent to the yellow foaming agent is 1:1 to 3:1.

5. The sheet according to claim 1, wherein an anti-slip layer is provided on a surface of the first solid layer facing away from the foamed layer.

6. The sheet according to claim 5, wherein a color film layer is provided on a surface of the second solid layer facing away from the foamed layer.

7. The sheet according to claim 6, wherein a wear-resistant layer is provided on a surface of the color film layer.

8. The sheet according to claim 7, wherein,
the second solid layer has a thickness of 1 mm to 1.5 mm;
the first solid layer has a thickness of 0.3 mm to 0.5 mm;
the foamed layer has a thickness of 2.5 mm to 3.5 mm;
the anti-slip layer has a thickness of 0.15 mm to 0.3 mm;
the wear-resistant layer has a thickness of 0.15 mm to 0.5 mm, and
the color film layer has a thickness of 0.07 mm to 0.08 mm.

9. The sheet according to claim 1, wherein the second composition further comprises a plasticizer, and the plasticizer accounts for 1% to 8% of a total mass of the second composition.

10. The sheet according to claim 9, wherein the plasticizer is dioctyl phthalate, epoxidized soybean oil or dioctyl terephthalate.

11. The sheet according to claim 1, wherein a density of the sheet is within 0.9 T/m$^3$ to 1.2 T/m$^3$, and shrinkage of the sheet at 80° C. is less than or equal to 0.5%.

12. The sheet according to claim 3, wherein the first internal lubricant and the second internal lubricant are one or two of polyol stearic acid and oxidized polyethylene wax.

13. The sheet according to claim 1, wherein the sheet is produced from a method comprising following steps:
(1) blending: blending the first composition for producing the foamed layer of the sheet, and the second composition for producing the first and second solid layers of the sheet, respectively, hotly blending first, and then cooling and stirring at a temperature of 105° C. to 120° C.;
(2) melting: when temperatures of the first and second compositions are decreased to 30° C. to 40° C., loading the blended first and second compositions to a hopper of an extruder which is preheated to 150° C. to 180° C., respectively; and heating and extruding the first and second compositions to obtain a first melt of the first composition and a second melt of the second composition, respectively;
(3) distributing and molding: feeding, by a distributor, the first and second melts of the first and second compositions into a mold at 160° C. to 180° C. for molding, so that the first solid layer and the second solid layer are directly formed on two sides of the foamed layer;
(4) shaping and combining: cooling and flattening the first and second solid layers and the foamed layer at 20° C. to 50° C.

14. The sheet according to claim 13, wherein the method further comprises following steps:
(5) gradually rising the temperature, placing respectively a color film layer(s) to be combined and/or an anti-slip layer to be combined on two sides of the two solid layers by a conveyor device(s), and then compressing and combining at 130° C. to 180° C.; and finally, placing a wear-resistant layer on a surface of the color film layer by a conveyor device, and then compressing and combining at 130° C. to 180° C. to form the sheet; and
(6) cutting: cooling and then cutting the sheet.

* * * * *